US010795078B2

(12) United States Patent
Landry et al.

(10) Patent No.: US 10,795,078 B2
(45) Date of Patent: Oct. 6, 2020

(54) MMF OPTICAL MODE CONDITIONING DEVICE

(71) Applicant: Finisar Corporation, Sunnyvale, CA (US)

(72) Inventors: Gary Landry, Allen, TX (US); Timo Gray, Allen, TX (US); Jason O'Daniel, Richardson, TX (US)

(73) Assignee: II-VI Delaware Inc., Wilmington, DE (US)

( * ) Notice: Subject to any disclaimer, the term of this patent is extended or adjusted under 35 U.S.C. 154(b) by 0 days.

(21) Appl. No.: 16/399,140

(22) Filed: Apr. 30, 2019

(65) Prior Publication Data

US 2019/0339454 A1     Nov. 7, 2019

Related U.S. Application Data

(60) Provisional application No. 62/665,229, filed on May 1, 2018.

(51) Int. Cl.
    *G02B 6/26*           (2006.01)
    *G02B 6/028*         (2006.01)
    *G02B 6/14*           (2006.01)

(52) U.S. Cl.
    CPC ......... *G02B 6/0281* (2013.01); *G02B 6/0288* (2013.01); *G02B 6/262* (2013.01); *G02B 6/268* (2013.01); *G02B 6/14* (2013.01)

(58) Field of Classification Search
    CPC ...... G02B 6/0281; G02B 6/0288; G02B 6/14; G02B 6/262; G02B 6/268; H04B 10/2581
    See application file for complete search history.

(56) References Cited

U.S. PATENT DOCUMENTS

| | | | | |
|---|---|---|---|---|
| 3,909,110 A | * | 9/1975 | Marcuse | G02B 6/02057 385/28 |
| 4,205,901 A | * | 6/1980 | Ramsay | C03B 37/018 385/124 |
| 4,723,828 A | | 2/1988 | Garel-Jones et al. | |
| 5,457,759 A | * | 10/1995 | Kalonji | G02B 6/2552 385/124 |
| 5,719,973 A | * | 2/1998 | Monroe | G02B 6/0281 385/123 |
| 6,847,770 B2 | * | 1/2005 | Kittaka | C03C 21/002 385/124 |
| 7,155,096 B2 | * | 12/2006 | Chanclou | G02B 6/2551 385/123 |

(Continued)

FOREIGN PATENT DOCUMENTS

WO     20160178595 A1     11/2016

OTHER PUBLICATIONS

International Search Report and Written Opinion dated Jul. 23, 2019, in related PCT Application No. PCT/US2019/030047.

*Primary Examiner* — Daniel Petkovsek
(74) *Attorney, Agent, or Firm* — Maschoff Brennan

(57) ABSTRACT

In one example, an optical device may include a waveguide having a core index of refraction that decreases along a length of the waveguide and an edge index of refraction of the waveguide that is constant along the length of the waveguide. The central rays of the optical signals travelling through the waveguide may be refracted towards higher radii while the outer rays propagate unaffected. The optical device may decrease dispersion of the optical signals travelling through an optical fiber.

18 Claims, 2 Drawing Sheets

(56) References Cited

U.S. PATENT DOCUMENTS

| | | | |
|---|---|---|---|
| 7,340,138 B1 | 3/2008 | Yablon | |
| 7,920,763 B1 * | 4/2011 | Shou | G02B 6/32 |
| | | | 385/31 |
| 8,509,577 B2 * | 8/2013 | Liu | G02B 6/32 |
| | | | 385/27 |
| 9,829,647 B2 * | 11/2017 | Lu | G02B 6/3846 |
| 9,995,826 B2 * | 6/2018 | Nagano | G01S 7/486 |
| 2006/0029348 A1 * | 2/2006 | Kempen | G02B 6/1228 |
| | | | 385/129 |
| 2007/0206912 A1 | 9/2007 | Minelly et al. | |
| 2011/0110627 A1 | 5/2011 | Tsai | |
| 2012/0127563 A1 * | 5/2012 | Farmer | G02B 6/14 |
| | | | 359/341.3 |
| 2018/0224607 A1 * | 8/2018 | Bookbinder | G02B 6/305 |
| 2018/0314071 A1 * | 11/2018 | Moore | G02B 27/0994 |

* cited by examiner

MMF OPTICAL MODE CONDITIONING DEVICE

CROSS-REFERENCE TO RELATED APPLICATIONS

This application claims priority to U.S. Provisional Application No. 62/665,229, filed May 1, 2018, titled MMF OPTICAL MODE CONDITIONING DEVICE, which is incorporated herein by reference in its entirety.

BACKGROUND

The present disclosure generally relates to transmission of optical signals in multimode optical fibers (MMF).

Multi-mode optical fiber is a type of optical fiber mostly used for communication over short distances, such as within a building or on a campus. Multi-mode fiber has a relatively large core diameter that enables multiple light modes to be propagated and limits the maximum length of a transmission link because of modal dispersion. Because of its relatively high capacity and reliability, multi-mode optical fiber generally is used for backbone applications in buildings, although there are other applications for multi-mode fibers.

The claimed subject matter is not limited to embodiments that solve any disadvantages or that operate only in environments such as those described above. This background is only provided to illustrate examples of where the present disclosure may be utilized.

SUMMARY

The present disclosure generally relates to transmission of optical signals in multimode optical fibers (MMF).

In one example embodiment, an optical device may include a waveguide having a core index of refraction that decreases along a length of the waveguide and an edge index of refraction of the waveguide that is substantially constant along the length of the waveguide. In some embodiments, the optical device may be a radial symmetric waveguide. In other embodiments, the optical device may be a fiber stub or a graded-index optic. The optical device may be positioned mid-span in an optical fiber. The optical device may be optically coupled to a first fiber core and a second fiber core. The optical device may include a constant diameter between the first fiber core and the second fiber core. The constant diameter may correspond to a diameter of the first fiber core and a diameter of the second fiber core. The optical device may be mechanically coupled to a first fiber core and a second fiber core.

In embodiments where the optical device is a waveguide, the waveguide may decrease dispersion of the optical signals travelling through the fiber cores. The central rays of optical signals travelling through the waveguide may be refracted towards higher radii while the outer rays propagate unaffected.

In another embodiment, an optical fiber may include the optical device including some or all of the aspects described above. The optical device may be positioned between a first portion of the optical fiber and a second portion of the optical fiber. The optical device may be positioned between a first end of the optical fiber and a second end of the optical fiber.

The optical device and the optical fiber may be configured to propagate multi-mode optical signals and/or shortwave optical signals.

In yet another embodiment, an optical device may include a waveguide having a first index of refraction proximate a center of the waveguide that decreases along a length of the waveguide and a second index of refection of the waveguide proximate a periphery of the waveguide that is constant along the length of the waveguide.

The optical device may be a radial symmetric waveguide, a fiber stub or a graded-index optic. The optical device may be positioned mid-span in an optical fiber. The optical device may be optically coupled to a first fiber core and a second fiber core and the optical device decreases dispersion of the optical signals travelling through the fiber cores. The central rays of optical signals travelling through the optical device may be refracted towards higher radii while the outer rays propagate unaffected.

This Summary introduces a selection of concepts in a simplified form that are further described below in the Detailed Description. This Summary is not intended to identify key features or essential characteristics of the claimed subject matter, nor is it intended to be used as an aid in determining the scope of the claimed subject matter.

DETAILED DESCRIPTION

Figure 1:
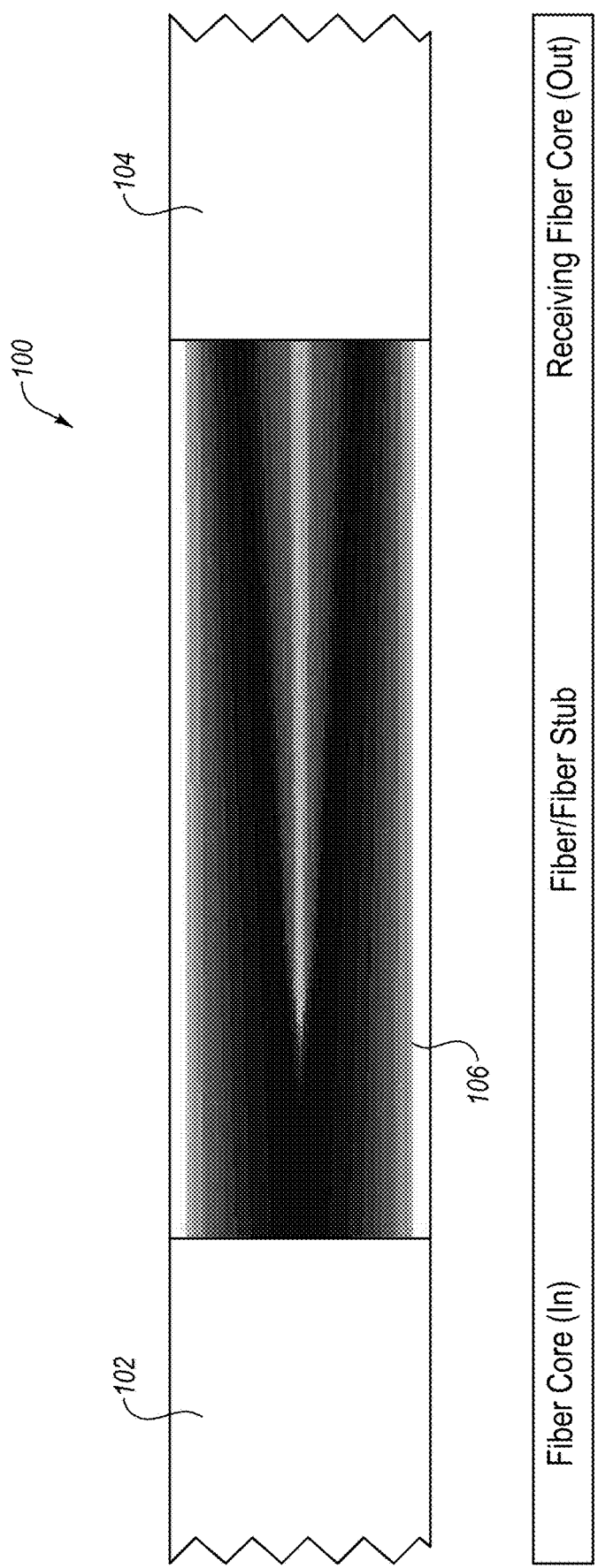
FIG. 1 is a schematic view of an example optical device.

The present disclosure generally relates to transmission of optical signals in multimode optical fibers (MMF).

Multi-mode optical fiber is a type of optical fiber mostly used for communication over short distances, such as within a building or on a campus. Multi-mode fiber has a relatively large core diameter that enables multiple light modes to be propagated and limits the maximum length of a transmission link because of modal dispersion. Because of its relatively high capacity and reliability, multi-mode optical fiber generally is used for backbone applications in buildings.

Typically, multi-mode optical fibers have much larger core diameters when compared to single-mode optical fibers. For example, multi-mode optical fibers typically have core diameters in the range of 50-100 micrometers, and also typically carry relatively larger wavelengths of light it. Because of the larger core and also the capability of using a large numerical aperture, multi-mode fibers generally have a higher "light-gathering" capacity than single-mode fiber. In practical terms, the larger core size simplifies connections and also allows the use of lower-cost electronics such as light-emitting diodes (LEDs) and vertical-cavity surface-emitting lasers (VCSELs). In some configurations, multi-mode lasers may operate at 850 nm and 1300 nm wavelengths. In contrast, single-mode fibers used in telecommunications typically operate at 1310 or 1550 nm. However, compared to single-mode fibers, the multi-mode fiber bandwidth—distance product limit is lower. Because multi-mode fiber has a larger core-size than single-mode fiber, it supports more than one propagation mode. Accordingly, multi-mode fiber is limited by modal dispersion, while single mode fiber generally is not.

The light sources sometimes used with multi-mode fiber produce a range of wavelengths and these each propagate at different speeds. In optics, chromatic dispersion is the phenomenon in which the phase velocity of a wave depends on its frequency. Media having this common property may be termed a dispersive media. This chromatic dispersion is another limit to the useful length for multi-mode fiber optic cable. In contrast, the light sources used to drive single-mode fibers generally produce coherent light of a single wavelength. Because of the combined modal and chromatic dispersion, multi-mode fiber has higher pulse spreading rates than single mode fiber, limiting multi-mode fiber's information transmission capacity. Typically, for multi-mode fibers, the longer the length of the fiber, the poorer the signal. Accordingly, the length of multi-mode fibers are generally more limited than the length of single mode fibers.

Higher data rates generally have smaller bit times and are more impacted by modal dispersion effects, significantly reducing the length a signal can propagate on multi-mode fiber. The modal dispersion manifests as information traveling at different group velocities down the fiber and a smeared out pulse at the receiver. One approach to mitigate this issue is to restrict the laser launch to those fiber modes with similar group velocities, significantly increasing the reach distance. This implementation is often implemented at the laser or transceiver. Another approach implements electronic compensation in the transmitter and the receiver. Such configurations result in significant electrical power penalties and are generally not efficient. Furthermore, both described approached require specifically designed lasers and/or transceivers and are not generally implemented using standard transceivers. In addition, using such specific lasers and/or transceivers may increase manufacturing costs and the overall complexity of the design.

The present disclosure relates to embodiments that permit using multimode fibers over longer distances while using standard transceivers. Additionally or alternatively, embodiments may be implemented to maintain the long reaches possible with mode conditioned transceivers in datacenters with impairments in their fiber plant.

The disclosed embodiments include standalone optical devices that may be implemented with conventional optical transmitters and transceivers. In some configurations, the optical device may be distinct from the transmitter. Additionally or alternatively, the optical device may be small enough to be added to a fiber panel that could take an unconditioned modal pattern in a multi-mode fiber and convert it to a mode pattern that can propagate long distances.

Some embodiments may be implemented to create a mode conditioned launch property in an already installed standard emission transceiver. Such implementations may be useful to maintain the existing optical fiber length when upgrading to a higher line rate. Additionally or alternatively, implementations may be used when a mode conditioned transceiver is not meeting the expected length benefit due to flaws in the existing fiber panel (e.g., poorly aligned connectors on a patch panel causing mode coupling to a faster central ray). Additionally or alternatively, the described embodiments may be implemented to recondition the optical power in optical fibers into the proper modes, restoring the intended target reach.

In one example embodiment, a radial symmetric waveguide may be implemented. The core index of refraction of the radial symmetric waveguide may decrease along its length while the index of refection at the edge stays constant. In such configurations, the central rays may be refracted towards higher radii while the outer rays propagate unaffected. The radial symmetric waveguide could be fabricated as a fiber stub or as a graded-index optic. In some implementations, the radial symmetric waveguide may be positioned between two standard optical fibers. The radial symmetric waveguide may decrease dispersion of the optical signals travelling through multimode optical fibers, thereby increasing the length that multimode optical fibers may be used without decreasing signal quality. The radial symmetric waveguide may be implemented as an optical device that does not require electrical power. Thus, the radial symmetric waveguide may increase the distances that optical signals may be transmitted through multimode optical fibers without requiring modifications to existing optical fibers, transceivers, or lasers.

The claimed subject matter is not limited to embodiments that solve any disadvantages or that operate only in environments such as those described above. This background is only provided to illustrate examples of where the present disclosure may be utilized.

Reference will be made to the drawings and specific language will be used to describe various aspects of the disclosure. Using the drawings and description in this manner should not be construed as limiting its scope. Additional aspects may be apparent in light of the disclosure, including the claims, or may be learned by practice. The drawings are non-limiting, diagrammatic, and schematic representations of example embodiments, and are not necessarily drawn to scale.

FIG. 1 illustrates a schematic view of an example optical device 100. In some configurations, the optical device 100 may be positioned mid-span in an optical fiber. In other configurations, the optical device 100 may be positioned between two standard optical fibers. Accordingly, the optical device 100 may be optically and/or mechanically coupled to a first fiber core 102 and a second fiber core 104. The fiber cores 102, 104 may be multimode fiber cores. The optical device 100 may include a waveguide 106 positioned between and optically coupled to the fiber cores 102, 104.

In some configurations, the waveguide 106 may be fabricated as a fiber stub or as a graded-index optic. In some configurations, the waveguide 106 may be a radial symmetric waveguide or radially symmetrical waveguide. The core index of refraction of the waveguide 106 may decrease along its length. The core index of refraction may refer to an index of refraction positioned at or a proximate to a center of the waveguide 106. Additionally or alternatively, the core index of refraction may refer to an index of refraction positioned at or a proximate to a longitudinal axis of the waveguide 106. The edge index of refection of the waveguide 106 may stay relatively constant. The edge index of refraction may refer to an index of refraction positioned at or a proximate to the edge or periphery of the waveguide 106.

In such configurations, the central rays of the optical signals travelling through the waveguide 106 may be refracted towards higher radii while the outer rays propagate unaffected. The optical device 100 and the waveguide 106 may decrease dispersion of the optical signals travelling through the fiber cores 102, 104, thereby increasing the length that multimode optical fibers may be used without decreasing signal quality. The waveguide 106 may be implemented as an optical device that does not require electrical power. Thus, the optical device 100 may increase the distances that optical signals may be transmitted through multimode optical fibers without requiring modifications to existing optical fibers, transceivers, or lasers.

In some configurations, the diameter of the waveguide 106 may be similar or the same as the diameter of the fiber cores 102, 104. As shown, the waveguide 106 includes a relatively constant diameter between the fiber cores 102, 104, and is generally aligned in a position between the fiber cores 102, 104. Although the diameter of the waveguide 106 is relatively constant, the index of refraction of the waveguide 106 is graded, thus it changes over the length of the waveguide 106. In some configurations, the diameter of the fiber cores 102, 104 and/or the waveguide 106 may be between 50-100 micrometers.

Figure 2:
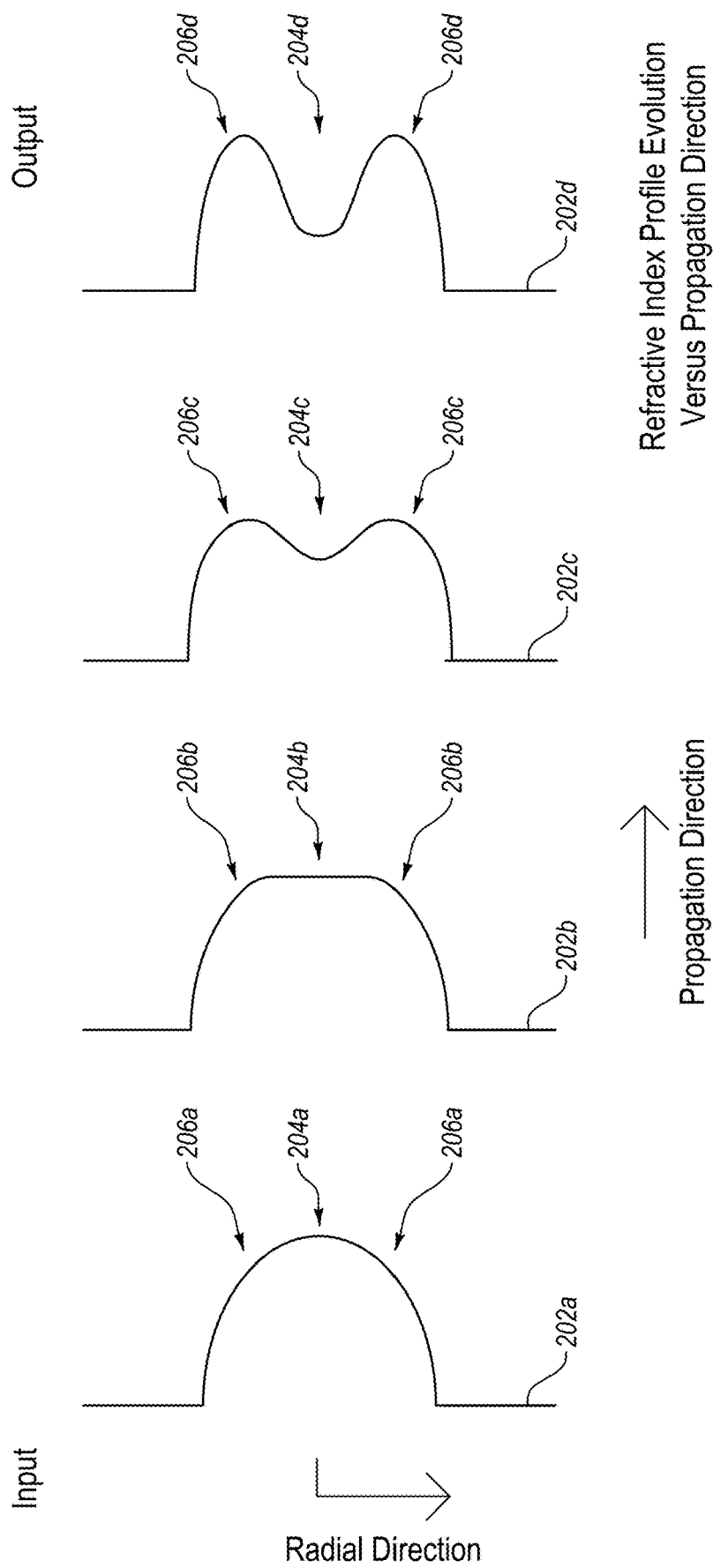
FIG. 2 is a schematic view of the refractive index profile of the optical device of FIG. 1.

FIG. 2 illustrates a schematic view of the refractive index profile of the optical device 100. In particular, FIG. 2 illustrates the changes of the refractive index profile of the waveguide 106 along the propagation direction of the optical signals. As illustrated, the core index of refraction of the waveguide 106 decreases along its length and the index of refraction at the edge or proximate the edge of the waveguide 106 stays relatively constant. FIG. 2 includes example refractive index profiles 202a, 202b, 202c, 202d. Each of the refractive index profiles 202a-d includes a refractive index at a corresponding core 204a, 204b, 204c, 204d of the waveguide 106. As shown, the index of refraction at the cores 204a-d decreases along the length of the waveguide 106 in the propagation direction. The index of refraction is largest at the core 204a of the index profile 202a, the index of refraction is relatively smaller at the core 204b of the index profile 202b, the index of refraction is further smaller at the core 204c of the index profile 202c, and the index of refraction is smallest at the core 204d of the index profile 202d. Each of the refractive index profiles 202a-d includes a refractive index at corresponding edges 206a, 206b, 206c, 206d of the waveguide 106. As shown, the index of refraction stays relatively constant at the edges 206a-d along the length of the waveguide 106 in the propagation direction. In such configurations, the central rays may be refracted towards higher radii while the outer rays propagate unaffected. This changes the distribution of light within the waveguide by guiding the light into the ring-shaped region of higher refractive index. This produces a ring-shaped modal pattern which is more conducive to propagating long distances.

As mentioned, the optical device 100 may be positioned mid-span in an optical fiber. In some configurations, the optical fiber may be a multimode optical fiber. In some configurations, the optical fiber may be may be 1 km, 300 meters, 100 meters, 70 meters in length or less. In other configurations, the optical device 100 may be implemented proximate or inside an optoelectronic transceiver.

In some configurations, an optical fiber may include the optical device 100. The optical device 100 may be positioned between a first portion of the optical fiber and a second portion of the optical fiber. The optical device 100 may be positioned between a first end of the optical fiber and a second end of the optical fiber.

The optical fiber may be a multi-mode optical fiber. The optical device 100 may be a multi-mode optical device configured to receive, transmit, or propagate multi-mode optical signals. Additionally or alternatively, the optical fiber may be a shortwave optical fiber configured to receive, transmit, or propagate shortwave optical signals (e.g., optical signals in a shortwave spectrum range). The optical device 100 may be a shortwave optical device configured to receive, transmit, or propagate shortwave optical signals (e.g., optical signals in a shortwave spectrum range).

In one example embodiment, an optical device may include a waveguide having a core index of refraction that decreases along a length of the waveguide and an edge index of refraction of the waveguide that is substantially constant along the length of the waveguide. In some embodiments, the optical device may be a radial symmetric waveguide. In other embodiments, the optical device may be a fiber stub or a graded-index optic. The optical device may be positioned mid-span in an optical fiber. The optical device may be optically coupled to a first fiber core and a second fiber core. The optical device may include a constant diameter between the first fiber core and the second fiber core. The constant diameter may correspond to a diameter of the first fiber core and a diameter of the second fiber core. The optical device may be mechanically coupled to a first fiber core and a second fiber core.

In embodiments where the optical device is a waveguide, the waveguide may decrease dispersion of the optical signals travelling through the fiber cores. The central rays of optical signals travelling through the waveguide may be refracted towards higher radii while the outer rays propagate unaffected.

In another embodiment, an optical fiber may include the optical device including some or all of the aspects described above. The optical device may be positioned between a first portion of the optical fiber and a second portion of the optical fiber. The optical device may be positioned between a first end of the optical fiber and a second end of the optical fiber.

The optical device and the optical fiber may be configured to propagate multi-mode optical signals and/or shortwave optical signals.

In yet another embodiment, an optical device may include a waveguide having a first index of refraction proximate a center of the waveguide that decreases along a length of the waveguide and a second index of refection of the waveguide proximate a periphery of the waveguide that is constant along the length of the waveguide.

The optical device may be a radial symmetric waveguide, a fiber stub or a graded-index optic. The optical device may be positioned mid-span in an optical fiber. The optical device may be optically coupled to a first fiber core and a second fiber core and the optical device decreases dispersion of the optical signals travelling through the fiber cores. The central rays of optical signals travelling through the optical device may be refracted towards higher radii while the outer rays propagate unaffected.

The terms and words used in the description and claims are not limited to the bibliographical meanings, but, are merely used to enable a clear and consistent understanding of the disclosure. It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those skilled in the art, may occur in amounts that do not preclude the effect the characteristic was intended to provide.

Aspects of the present disclosure may be embodied in other forms without departing from its spirit or essential characteristics. The described aspects are to be considered in all respects illustrative and not restrictive. The claimed subject matter is indicated by the appended claims rather than by the foregoing description. All changes which come within the meaning and range of equivalency of the claims are to be embraced within their scope.

What is claimed is:

1. An optical device comprising:
   a waveguide having a first index of refraction proximate a center of the waveguide that decreases along a length of the waveguide and a second index of refraction of the waveguide proximate a periphery of the waveguide that is constant along the length of the waveguide;

a first fiber core and a second fiber core optically coupled to the waveguide such that the waveguide decreases dispersion of the optical signals travelling through the first fiber core and the second fiber core;

wherein central rays of optical signals travelling through the waveguide are refracted towards higher radii of the waveguide while outer rays of optical signals propagate unaffected through the periphery of the waveguide.

2. An optical device comprising a waveguide having a core index of refraction that decreases along a length of the waveguide and an edge index of refraction of the waveguide that is substantially constant along the length of the waveguide such that central rays of optical signals travelling through the waveguide are refracted towards higher radii of the waveguide while outer rays of optical signals propagate unaffected through a periphery of the waveguide.

3. The optical device of claim 2, wherein the optical device comprises a radial symmetric waveguide.

4. The optical device of claim 2, wherein the optical device comprises a fiber stub or a graded-index optic.

5. The optical device of claim 2, wherein the optical device is positioned mid-span in an optical fiber cable.

6. The optical device of claim 2, wherein the optical device is optically coupled to a first fiber core and a second fiber core.

7. The optical device of claim 6, wherein the optical device includes a constant diameter between the first fiber core and the second fiber core.

8. The optical device of claim 7, wherein the constant diameter corresponds to a diameter of the first fiber core and a diameter of the second fiber core.

9. The optical device of claim 6, wherein the waveguide decreases dispersion of the optical signals travelling through the fiber cores.

10. The optical device of claim 2, wherein the optical device is mechanically coupled to a first fiber core and a second fiber core.

11. An optical fiber cable comprising the optical device of claim 2.

12. The optical fiber of claim 11, wherein the optical device is positioned between a first portion of the optical fiber cable and a second portion of the optical fiber cable.

13. The optical fiber of claim 11, wherein the optical device is positioned between a first end of the optical fiber cable and a second end of the optical fiber cable.

14. The optical fiber of claim 11, wherein the optical device and the optical fiber cable are configured to propagate shortwave multi-mode optical signals.

15. An optical device comprising a waveguide having a first index of refraction proximate a center of the waveguide that decreases along a length of the waveguide and a second index of refraction of the waveguide proximate a periphery of the waveguide that is constant along the length of the waveguide such that central rays of optical signals travelling through the optical device are refracted towards higher radii.

16. The optical device of claim 15, wherein the optical device comprises a radial symmetric waveguide, a fiber stub or a graded-index optic.

17. The optical device of claim 15, wherein the optical device is positioned mid-span in an optical fiber cable between a first fiber core and a second fiber core.

18. The optical device of claim 15, wherein the optical device is optically coupled to a first fiber core and a second fiber core and the optical device decreases dispersion of the optical signals travelling through the fiber cores.

* * * * *